United States Patent [19]

Rike

[11] Patent Number: 5,660,253

[45] Date of Patent: Aug. 26, 1997

[54] DISC BRAKE PISTON HEAT SHIELD

[75] Inventor: Russell E. Rike, Spring Valley, Ohio

[73] Assignee: Dayton Walther Corporation, Dayton, Ohio

[21] Appl. No.: 399,376

[22] Filed: Mar. 7, 1995

[51] Int. Cl.[6] ............................................. F16D 65/82
[52] U.S. Cl. ........................... 188/264 G; 188/72.4; 192/113.4; 403/336
[58] Field of Search ..................... 188/71.1, 71.6, 188/72.4, 72.5, 369, 370, 264 G, 264 R; 192/85 C, 113.4; 403/336, 338

[56] References Cited

U.S. PATENT DOCUMENTS

| | | | |
|---|---|---|---|
| 4,401,012 | 8/1983 | Emmett | 188/264 G X |
| 4,513,844 | 4/1985 | Hoffman, Jr. | 188/71.6 |
| 4,537,289 | 8/1985 | VonGrunberg et al. | 188/264 G X |
| 4,582,180 | 4/1986 | Lauterwasser et al. | 188/264 G |
| 4,709,795 | 12/1987 | Ferris | 192/106 F |
| 4,977,987 | 12/1990 | Schmidt et al. | 188/264 G |
| 5,435,420 | 7/1995 | White | 188/264 G |
| 5,487,453 | 1/1996 | Moroni | 188/264 G |

FOREIGN PATENT DOCUMENTS

| | | | |
|---|---|---|---|
| 3743291 | 6/1989 | Germany | 188/264 G |
| 2111146 | 6/1983 | United Kingdom | 188/264 G |

OTHER PUBLICATIONS

Drawing No. 69330668, Dated Jun. 1984.
Drawing No. 60-450410, Dated May 1987.

Primary Examiner—Lee W. Young
Assistant Examiner—Chris Schwartz
Attorney, Agent, or Firm—MacMillan, Sobanski & Todd

[57] ABSTRACT

An improved structure for a disc brake piston heat shield adapted for use in a disc brake assembly includes a caliper provided with at least one cylindrical recess formed therein. A piston is slidably disposed in the recess. The piston includes a closed end and an open end. The open end of the piston is provided with at least a pair of projections extending therefrom. The projections define a pair of abutment surfaces and a pair of end surfaces located axially inward relative to the abutment surfaces, A pair of brake shoes are carried by the disc brake assembly and are disposed on opposite axial sides of an associated rotor. Each brake shoe includes a backing plate and a friction pad. An actuation system is carried by the caliper for selectively moving the brake shoes between a non-braking position, wherein each of the friction pads is spaced apart from the adjacent side of the rotor, and a braking position, wherein each of the friction pads frictionally engages the adjacent side of the rotor. A heat shield is attached to the open end of the piston. The heat shield includes a pair of openings generally corresponding to the shape of the projections, a pair of outwardly extending tangs adjacent the openings and adapted to frictionally engage an inner surface of the projections to attach the heat shield to the piston, and a reversely bent back outer peripheral end which is spaced apart from an associated dust boot seal.

21 Claims, 4 Drawing Sheets

DISC BRAKE PISTON HEAT SHIELD

BACKGROUND OF THE INVENTION

This invention relates in general to vehicle disc brake assemblies and in particular to an improved structure for a disc brake piston heat shield adapted for use in such a vehicle disc brake assembly.

Most vehicles are equipped with a brake system for retarding or stopping movement of the vehicle in a controlled manner. A typical brake system for an automobile and light duty truck includes a disc brake assembly for the front wheels of the vehicle, and either a disc brake assembly or a drum brake assembly for the rear wheels of the vehicle. A typical brake system for a medium duty truck includes a disc brake assembly on all four wheels of the vehicle. The brake assemblies are typically actuated by hydraulic or pneumatic pressure generated when an operator of the vehicle depresses a brake pedal. The structures of the disc brake assembly, as well as the actuators therefor, are well known in the art.

There are two basic types of calipers for use in disc brake assemblies, namely, a "floating" caliper disc brake assembly, and a "fixed" caliper disc brake assembly. A floating caliper type of disc brake assembly is usually used on automobiles and light and medium duty trucks. A conventional floating caliper type of disc brake assembly includes a brake caliper which is supported by a pair of pins for sliding movement relative to an anchor plate which is secured to a fixed, non-rotatable component of the vehicle. A fixed caliper type of disc brake assembly is sometimes used on automobiles and light and medium duty trucks. A conventional fixed caliper type of disc brake assembly includes a brake caliper which is solidly fixed to a fixed, non-rotatable component of the vehicle.

In both types of disc brake assemblies, a pair of brake shoes are supported by the disc brake assembly for sliding movement relative thereto. The brake shoes have respective friction pads which are disposed on opposite sides of a rotor. The rotor, in turn, is connected to the wheel of the vehicle for rotation therewith. To effect braking action, the brake shoes are moved inwardly toward one another so as to frictionally engage the opposed sides of the rotor. Such frictional engagement causes retarding or stopping of the rotational movement of the rotor and, therefore, the wheel of the vehicle in a controlled manner.

To accomplish this in a fixed caliper type of disc brake assembly, the brake caliper assembly includes an inboard caliper assembly disposed adjacent an inboard brake shoe, and an outboard caliper assembly disposed adjacent an outboard brake shoe. One or more hydraulically or pneumatically actuated pistons are provided in respective cylindrical recesses formed in the inboard caliper assembly adjacent the inboard brake shoe, and one or more hydraulically or pneumatically actuated pistons are provided in respective cylindrical recesses formed in the outboard caliper assembly adjacent the outboard brake shoe. This type of construction is commonly referred to as an "opposed" piston caliper design. When the brake pedal is depressed, the pistons urge the brake shoes toward one another and into engagement with the associated side of the rotor. As result, the brake shoes frictionally engage the opposed sides of the rotor.

During frictional engagement of the brake shoes with the rotor, a considerable amount of heat is generated. It is known to provide a heat shield on the piston of the disc brake to block or shield certain components of the disc brake assembly from the heat generated during braking, and/or to prevent fluid boil from occurring as a result of the heat. Thus, it would be desirable to provide an improved structure for a disc brake piston heat shield which protects associated components of the disc brake assembly from the heat generated during braking and minimizes the possibility of fluid boil, yet is relatively inexpensive and easy to manufacture.

SUMMARY OF THE INVENTION

This invention relates to an improved structure for a disc brake piston heat shield adapted for use in a disc brake assembly which is relatively inexpensive and easy to manufacture. In particular, the disc brake assembly includes a caliper provided with at least one cylindrical recess formed therein. A piston is slidably disposed in the recess. The piston includes a closed end and an open end. The open end of the piston is provided with at least a pair of projections extending therefrom. The projections define a pair of abutment surfaces and a pair of end surfaces located axially inward relative to the abutment surfaces. A pair of brake shoes are carried by the disc brake assembly and are disposed on opposite axial sides of an associated rotor. Each brake shoe includes a backing plate and a friction pad. An actuation system is carried by the caliper for selectively moving the brake shoes between a non-braking position, wherein each of the friction pads is spaced apart from the adjacent side of the rotor, and a braking position, wherein each of the friction pads frictionally engages the adjacent side of the rotor. A heat shield is attached to the open end of the piston. The heat shield includes a pair of openings generally corresponding to the shape of the projections, a pair of outwardly extending tangs adjacent the openings and adapted to frictionally engage an inner surface of the projections to attach the heat shield to the piston, and a reversely bent back outer peripheral end which is spaced apart from an associated dust boot seal.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
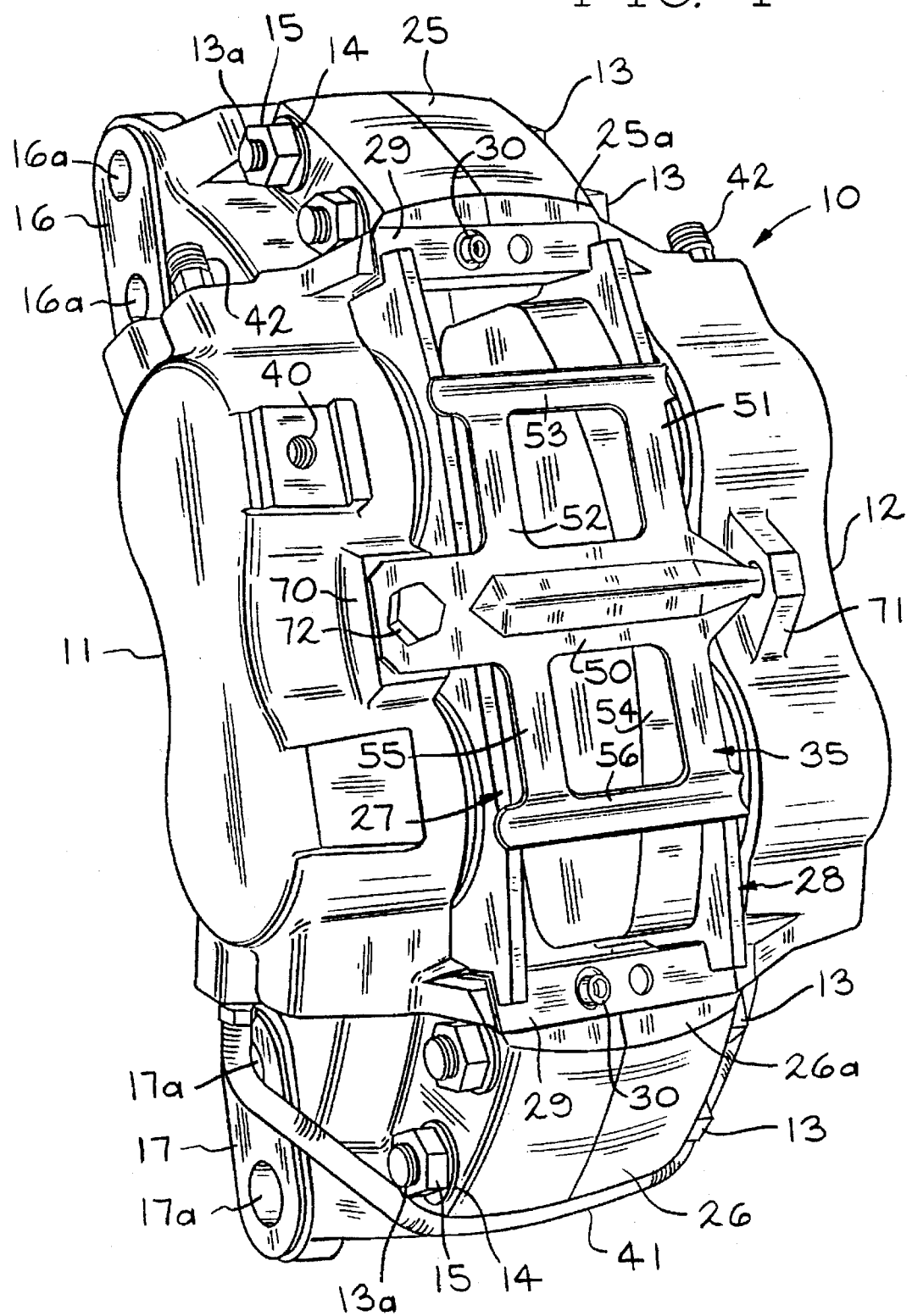
FIG. 1 is a perspective view of a portion of a vehicle disc brake assembly adapted to include an improved disc brake piston heat shield in accordance with this invention.
Figure 2:
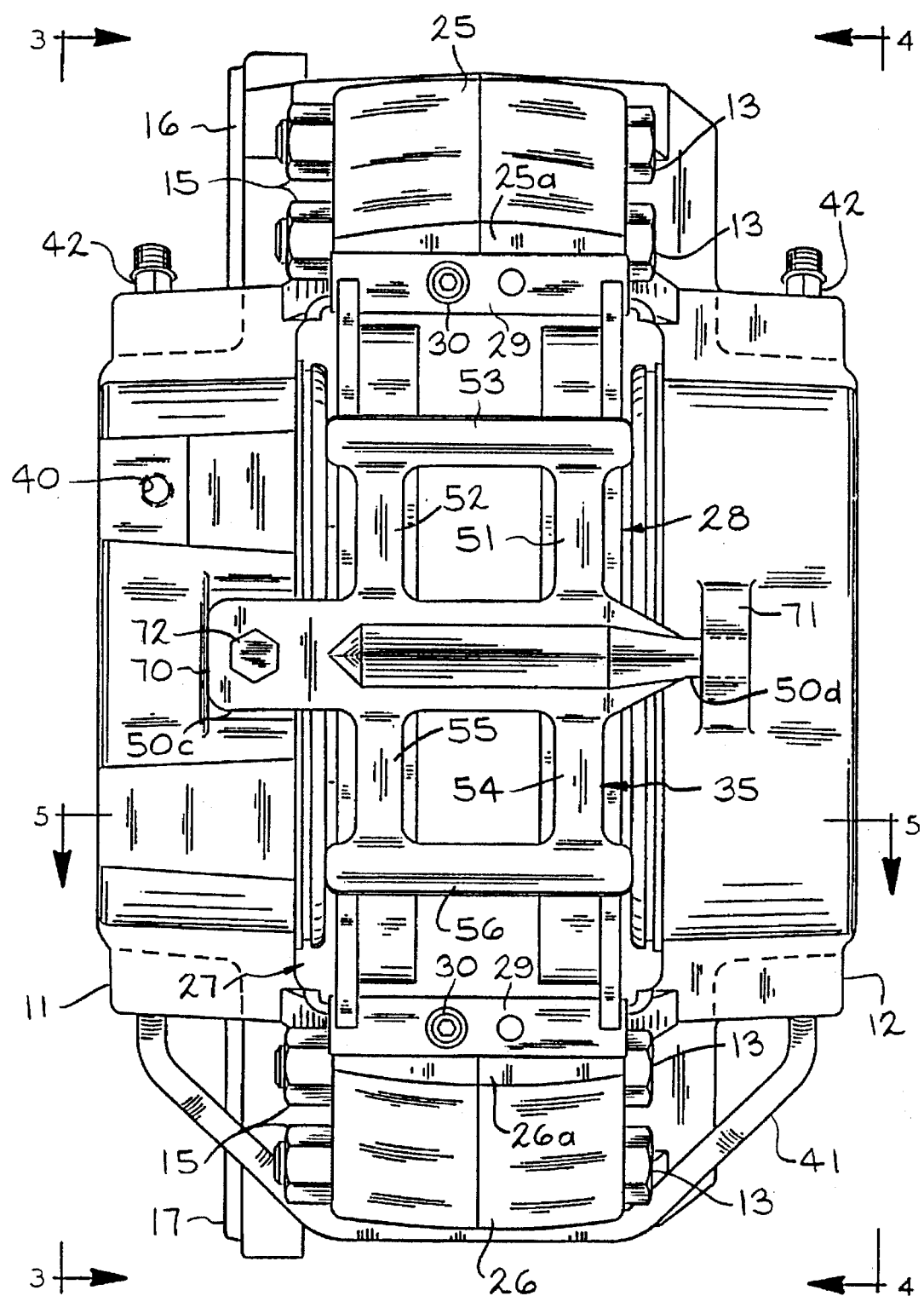
FIG. 2 is a top plan view of the disc brake assembly illustrated in FIG. 1.

Referring now to the drawings, there is illustrated in FIGS. 1 and 2 a vehicle disc brake assembly, indicated generally at 10, and constructed in accordance with the present invention. The general structure and operation of the disc brake assembly 10 is conventional in the art. Thus, only those portions of the disc brake assembly 10 which are necessary for a full understanding of this invention will be explained and illustrated.

Figure 3:
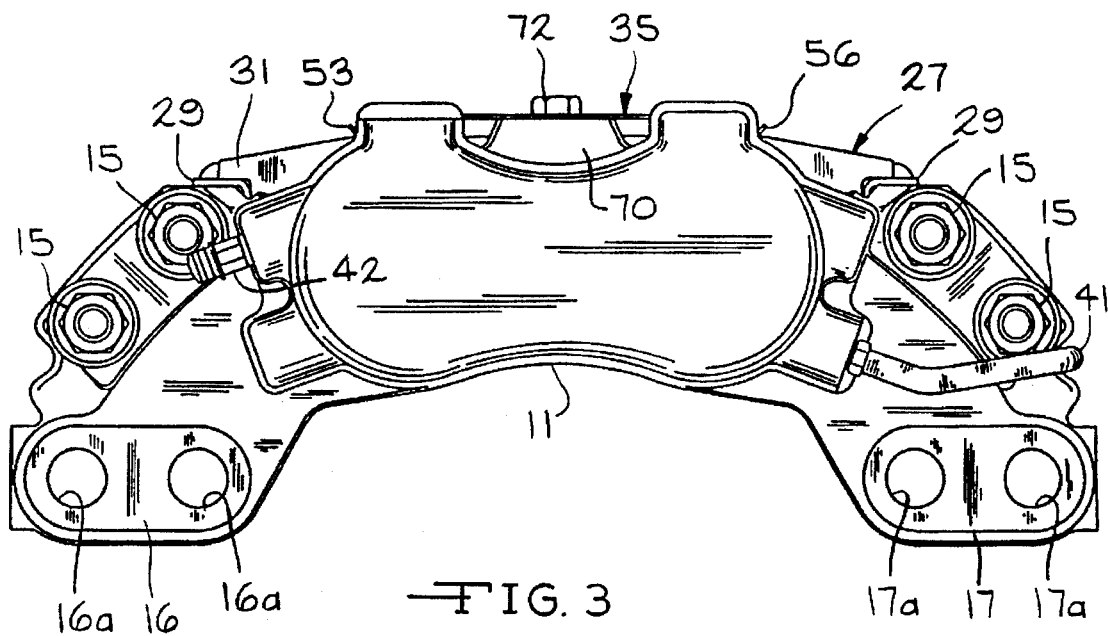
FIG. 3 is an elevational view of the disc brake assembly taken along line 3—3 of FIG. 2.
Figure 4:
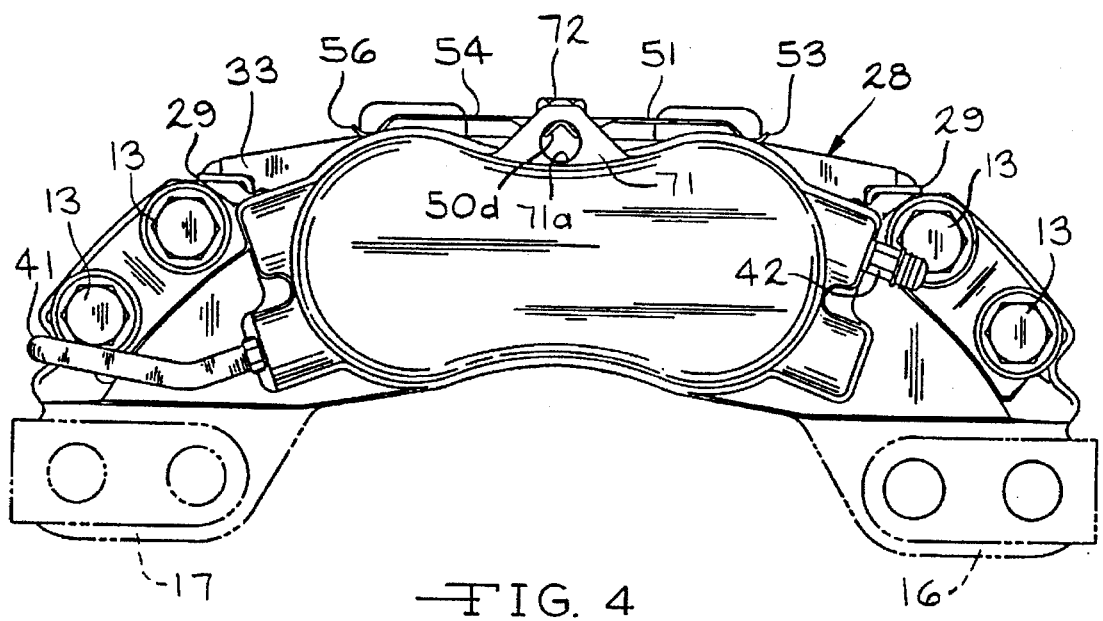
FIG. 4 is an elevational view of the disc brake assembly taken along line 4—4 of FIG. 2.

The illustrated disc brake assembly is an opposed four piston fixed caliper type of disc brake assembly, and is associated with a right wheel of a vehicle. The disc brake assembly 10 is a two-piece construction, and includes an inboard brake caliper assembly 11, best shown in FIG. 3, and an outboard brake caliper assembly 12, best shown in FIG. 4. The construction of the inboard caliper assembly 11 and the outboard caliper assembly 12 are generally similar to one another, and like reference numbers will be used for corresponding parts. Alternatively, the inboard caliper assembly 11 and the outboard caliper assembly 12 may be integrally formed.

The inboard brake caliper assembly 11 and the outboard brake caliper assembly 12 are provided with respective pairs of aligned apertures formed therethrough. Threaded bolts 13 extend through the respective pairs of apertures, and washers 14 and nuts 15 are installed on threaded ends 13a of the bolts 13 to secure the inboard caliper assembly 11 to the outboard caliper assembly 12.

The inboard caliper assembly 11 includes a pair of anchoring arms 16 and 17 provided at opposed ends thereof. Each of the arms 16 and 17 are provided with a pair of apertures 16a and 17a, respectively, formed therethrough, and are adapted to receive bolts (not shown) for securing the inboard caliper assembly 11, and therefore the assembled disc brake assembly 10, to a fixed, non-rotatable component of the vehicle, such as an axle flange (when the disc brake assembly is installed for use on the rear of the vehicle), or a steering knuckle (when the disc brake assembly is installed for use on the front of the vehicle).

Figure 5:
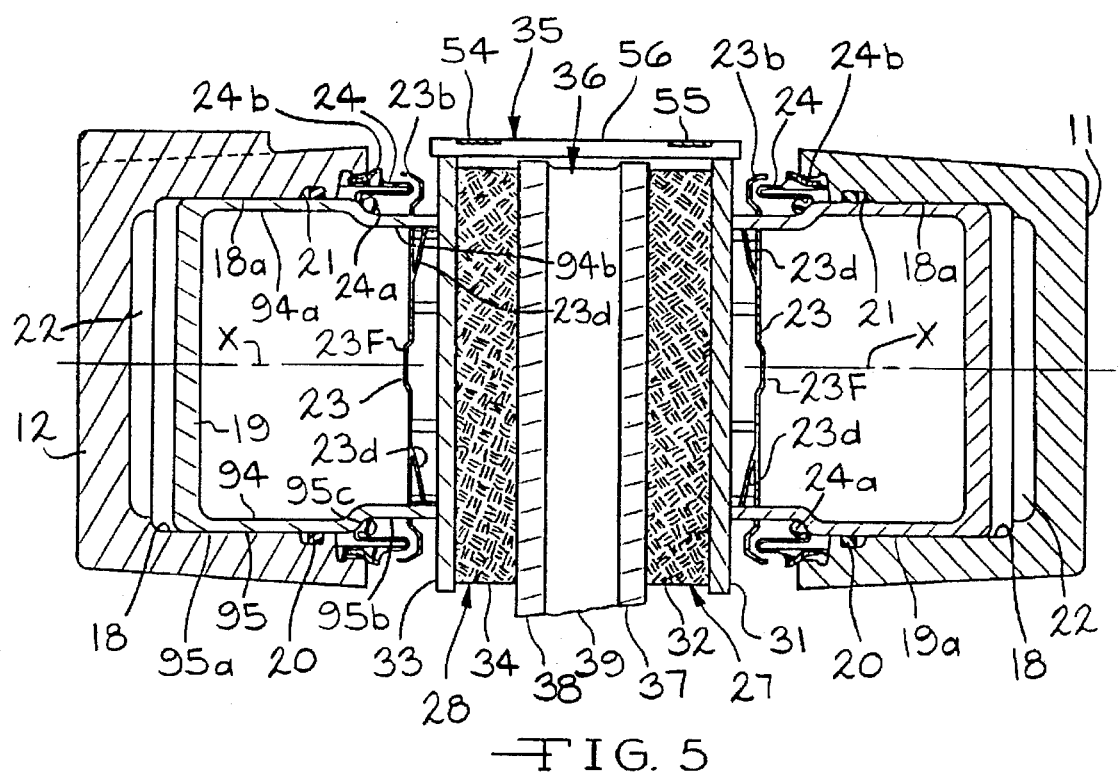
FIG. 5 is a cross-sectional view taken along line 5—5 of FIG. 2.

The illustrated inboard caliper assembly 11 includes a pair of cylindrical recesses 18 formed therein, only one recess 18 is shown in FIG. 5. Similarly, the outboard caliper assembly 12 includes a pair of cylindrical recesses 18 formed therein, only one recess 18 is shown in FIG. 5. A piston 19 is disposed in each of the cylindrical recesses 18, and a fluid seal 20 is disposed in an annular groove 21 formed in a side wall 18a of the cylindrical recess 18, and engages an outer side wall 95a of the piston 19. The fluid seal 20 is provided to define a sealed hydraulic actuator chamber 22, within which the piston 19 is disposed for sliding movement.

In particular, the inboard caliper assembly 11 includes a pair of hydraulic actuator chambers 22 which are connected together by a fluid passageway (not shown) formed therein. Similarly, the outboard caliper assembly 12 includes a pair of hydraulic actuator chambers 22 which are connected together by a fluid passageway (not shown) formed therein. Also, the fluid seal 20 is designed to function as a roll-back seal which retracts the piston 19 within the cylindrical recess 18 when the disc brake assembly 10 is not actuated. Thus, it will be appreciated that the illustrated brake actuating means is a hydraulic actuating means. However, other well known types of actuating means, such as pneumatic, electrical, and mechanical, can be used. Also, as will be discussed below, a heat shield 23 is provided adjacent an outboard end of each of the pistons 19.

A dust boot seal 24 is provided about the outboard end of the piston 19 to prevent water, dirt, and other contaminants from entering into the cylindrical recess 18. The dust boot seal 24 is formed from a flexible material and has a first end 24a which engages an outer side wall of a shoulder 95c of the piston 19 and a second end 24b which engages an annular recess formed adjacent the open ends of the associated cylindrical recesses 18. A plurality of flexible convolutions are provided in the dust boot seal 24 between the first and second ends thereof to accommodate movement of the pistons 19 within each of the respective cylindrical recesses 18.

The disc brake assembly 10 includes a pair of arms 25 and 26 having respective guide rails 25a and 26a formed thereon. The guide rails 25 and 26 extend transverse to the arms 25 and 26, and extend parallel to one another. As will be discussed, a pair of brake shoes 27 and 28 are supported on the guide rails 25a and 26a for sliding movement relative thereto. Preferably, a hardened replaceable insert 29 is secured to each of the guide rail 25 and 26 by a fastener 30. The inserts 29 are preferably formed from stainless steel, and provide a smooth, corrosion resistant sliding surface for the brake shoes 27 and 28.

The inboard brake shoe 27 includes a backing plate 31 having a friction pad 32 secured thereto. Similarly, the outboard brake shoe 28 includes a backing plate 33 having a friction pad 34 secured thereto.

In the illustrated embodiment, a brake shoe hold down clip 35 is releasably attached to the disc brake assembly 10 to bias opposed upper ends 31a and 33a of the backing plates 31 and 33, respectively, of brake shoes 27 and 28 against the guide rails 25a and 26a. The hold down clip 35 is generally arcuate shaped, and is formed having a longitudinally extending central mounting portion 50. A first pair of opposed spaced apart arms 51 and 52 extend transverse to and outwardly from one side 50a of the central mounting portion 50. The ends of the first pair of arms 51 and 52 terminate at and are interconnected by a generally U-shaped first end arm 53 which extends generally parallel to the central mounting portion 50.

The hold down dip 35 further includes a second pair of spaced apart arms 54 and 55 extend transverse to and outwardly from the opposite side 50b of the central mounting portion 50. The ends of the second pair of arms 54 and 55 terminate at and are interconnected by a generally U-shaped second end arm 56 which extends generally parallel to the central mounting portion 50.

The central mounting portion 50 tinther includes an aperture formed adjacent one end 50c thereof, and a raised, generally inverted V-shaped strengthening rib 61 which extends substantially the entire length thereof and terminates at an opposite end 50d. The end 50d of the hold down clip is disposed in an opening formed in a raised mounting pad 71 provided on the outboard caliper assembly 12. A bolt 72 having a threaded end extends through the aperture 60 in the hold down clip 35 and is threadably received in a threaded aperature formed in a raised mounting pad 70 provided on the inboard caliper assembly 11.

As shown in FIG. 5, the brake shoes 27 and 28 are disposed on opposite sides of a rotor 36. The rotor 36 is generally flat and circular in shape and is secured in a conventional manner to a rotatable wheel (not shown) of the vehicle. The illustrated rotor 36 includes a pair of opposed braking discs 37 and 38 which are spaced apart from one another by a plurality of intermediate vanes 39 in a known manner.

When it is desired to actuate the disc brake assembly 10 to retard or stop the rotation of the brake rotor 36 and the vehicle wheel associated therewith, the driver of the vehicle depresses the brake pedal (not shown). In a manner which is well known in the art, the depression of the brake pedal causes pressurized hydraulic fluid to be introduced into the disc brake assembly via a threaded inlet port 40 provided in the inboard caliper assembly 11. The inlet port 40 is connected through a brake line (not shown) to a master cylinder (not shown) of the vehicle brake system. The brake line is attached to the inlet port 40 by a threaded fitting (not shown). The fluid flows from the inlet port 40 into the inboard fluid chambers 22 to urge the associated pistons 19 in the inboard caliper assembly 11 in the outboard direction (toward the left when viewing FIG. 5) into engagement with the backing plate 31 of the inboard brake shoe 27.

The fluid chambers 22 of the inboard caliper assembly 11 are connected to the fluid chambers 22 of the outboard caliper assembly 12 by a fluid supply assembly 41. Thus, at the same time, the fluid flows through the fluid supply assembly 41 into the outboard fluid chambers 22 to urge the associated pistons 19 in the outboard caliper assembly 12 in the inboard direction (toward the left when viewing FIG. 5) into engagement with the backing plate 33 of the outboard brake shoe 28. As a result, the friction pad 32 of the inboard brake shoe 27 is moved into frictional engagement with the inboard braking disc 37 of the rotor 36, and the friction pad 34 of the outboard brake shoe 28 is simultaneously moved into frictional engagement with the outboard braking disc 38 of the brake rotor 36. As a result, the rotor 36 is frictionally engaged by the friction pads 32 and 34 to retard relative rotational movement thereof.

The disc brake assembly 10 further includes a pair of bleeder screws 42 which are received in a threaded aperture provided in each of the inboard caliper assembly 11 and the outboard caliper assembly 12. The bleeder screws 42 are provided to bleed air from the associated fluid chambers 22 when the disc brake assembly 10 is initially connected to the vehicle hydraulic brake system.

Figure 6:
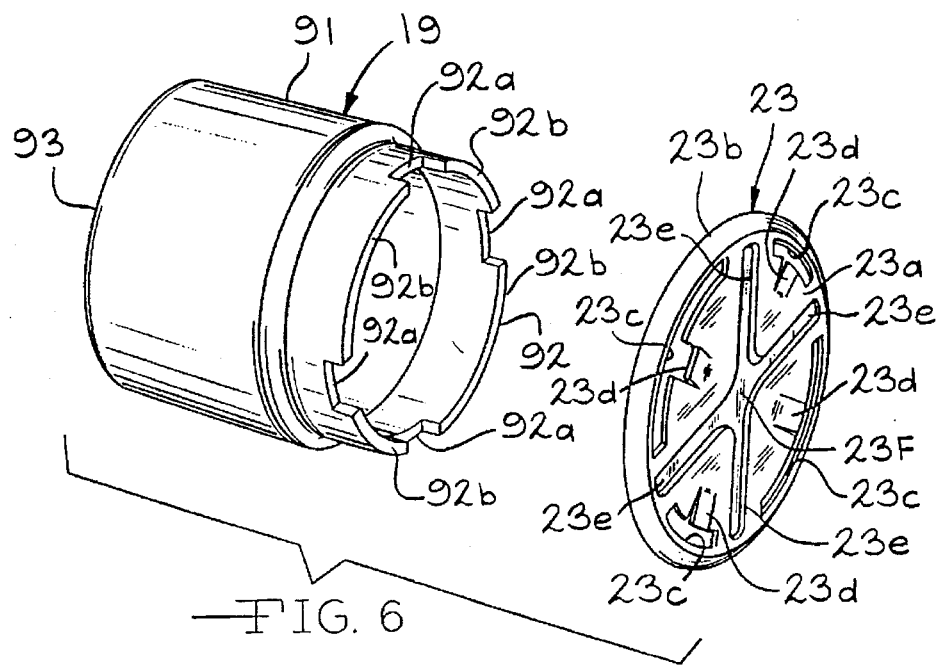
FIG. 6 is an exploded perspective view of the disc brake piston and heat shield.

Referring now to FIGS. 5 and 6, the structure of the piston 19 and the heat shield 23 will be discussed. As shown therein, the piston 19 includes a body 91 which is preferably formed from stainless steel or carbon steel, and may be electroplated with zinc for corrosion protection. The body 91 of the piston 19 is generally hollow and cylindrical in shape, having an open end 92 and a closed end 93. The open end 92 of the piston 19 defines an abutment surface which is oriented perpendicular to a longitudinal axis X of the piston 19.

The body 91 of the piston 19 further defines an axially extending inner cylindrical surface 94, and an axially extending outer cylindrical surface 95. The inner cylindrical surface 94 includes a first inner surface 94a, and a reduced diameter second inner surface 94a. Similarly, the outer cylindrical surface 95 includes a first outer surface 95a, and a reduced diameter second outer surface 95b. The first and second inner surfaces 94a and 94b extend parallel to the first and second outer surfaces 95a and 95b, respectively, and concentric with a longitudinal axis X of the piston 19. The transition between the first and second outer surfaces 95a and 95b defines a shoulder 95c, which receives the end 24a of the dust boot seal 24. In the illustrated embodiment, the open end 92 of the piston 19 is castellated, and defines four equidistantly spaced recessed sections 92a and four equidistantly spaced projections 92b.

The heat shield 23 is formed from a strip of stamped stainless steel or carbon steel, and may be electroplated with zinc for corrosion protection. However, the heat shield 23 may be formed from other materials, such as brass. The heat shield 23 is generally circular in shape and includes a generally flat body 23a having a reversely bent back outer peripheral end 23b. The illustrated outer peripheral end 23b is generally U-shaped.

The body 23a of the heat shield 23 is provided with four equidistantly spaced arcuate shaped openings 23c formed therein. The openings 23c generally correspond to the shape of the projections 92b provided on the open end 92 of the piston 19. The body 23a of the heat shield 23 further includes four equidistantly spaced outwardly extending tangs 23d provided thereon. In the illustrated embodiment, an outwardly extending tang 23d is provided on the heat shield 23 adjacent a respective one of each of the openings 23c.

In order to assemble the piston 19 and heat shield 23, the openings 23c in the heat shield 23 are disposed adjacent the projections 92b of the piston 19. The heat shield 93 is then moved toward the closed end 23 of the piston 19. During this movement, the tangs 23d frictionally engage the inner surface of the projections 92b and are biased outwardly as the heat shield 23 is moved toward the closed end 93 of the piston 19. The heat shield 23 is further advanced until the body 23a engages the end surfaces of the recessed portions 92a of the piston 19.

Preferably, the body 23a of the heat shield 23 is provided with a stamped, generally X-shaped portion which defines four inwardly raised legs 23e. The legs 23e extend radially outwardly from a center 23f of the heat shield a predetermined distance. In particular, the legs 23e extend outwardly so that when the heat shield 23 is installed on the piston 19, the inner surfaces of the raised legs 23e of the heat shield 23 engage the end surfaces of the recessed portions 92a of the piston 19. As a result of this, the contact area between the heat shield 23 and the piston 19 is minimized, and air may flow between the interior and exterior of the piston 19 through openings defined between the end surfaces of the recessed portions, 92a and the adjacent inner surface of the heat shield 23.

As can be seen in FIG. 5, the body 23a of the heat shield 23 is operative to shield the interior of the piston 19 from the heat generated during application of the disc brake assembly 10. Also, the outer peripheral end 23b of the heat shield 23 is spaced apart from engagement with the boot seal 24. As a result, the heat shield 23 also functions to shield the boot seal 24 from the heat generated during braking.

It will be appreciated that while the present invention has been described and illustrated in conjunction with the particular vehicle disc brake assembly disclosed herein, the invention may be used in conjunction with other disc brake assemblies. For example, the invention may be used in conjunction with a sliding caliper type of disc brake assembly.

Also, it will be appreciated that other piston structures can be used in conjunction with the present invention. For example, the body of the piston 19 may be formed from different materials, such as for example, a synthetic resin material. Also, the inner cylindrical surface 94 and the outer cylindrical surface 95 of the piston 19 may extend uninterrupted from the closed end 93 to the open end 92 thereof. In addition, the open end 92 of the piston 19 may have a different configuration than illustrated. For example, the number and spacing of the projections 92b may be varied as desired. In addition, the configuration of the projections 92b may be other than illustrated. The important feature of the structure of the piston 19 is that at least a pair of projections 92b are provided on the open end 92 thereof for two purposes. First, the projections 92b facilitate the attachment of the associated heat shield 23 to the piston. Secondly, the end surfaces of the projections 92b define abutment surfaces adapted to engage the backing plates 31 and 33 of the brake shoes 27 and 28, respectively, when the associated fluid chambers 22 are pressurized to cause the pistons 19 to slide toward the rotor 36 as described above.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A piston assembly adapted for use in a disc brake assembly comprising:

a piston defining an axis and including a closed end and an open end, said open end of said piston provided with at least a pair of generally axially extending projections; and a heat shield including a body having at least a pair of openings formed therein, said projections extending respectively through said openings to support said heat shield on said open end of said piston.

2. A heat shield adapted for use with a disc brake piston in a disc brake assembly comprising:

a body defining a central axis and having an opening formed therethrough which is offset from said central axis, said opening defining an inner edge and an outer edge relative to said central axis; and a tang extending at least partially outwardly from said inner edge of said opening toward said outer edge.

3. The heat shield defined in claim 2 wherein said body further includes an inwardly extending raised leg.

4. The heat shield defined in claim 2 wherein said opening in said body is generally arcuately shaped.

5. The heat shield defined in claim 2 wherein said body includes a generally inwardly extending reversely bent back outer peripheral edge.

6. A piston assembly adapted for use in a disc brake assembly comprising:

a piston defining an axis and including a closed end and an open end, said open end of said piston provided with at least a pair of generally axially extending projections; and a heat shield including a body having at least a pair of openings formed therein and at least a pair of tangs, said projections extending respectively through said openings to support said heat shield on said open end of said piston, said tangs frictionally engaging said projections.

7. The piston assembly defined in claim 6 wherein each of said projections defines an inner surface, and said heat shield further includes a plurality of tangs, each tang adapted to respectively frictionally engage said inner surface of said projection when said heat shield is supported on said open end of said piston.

8. The piston assembly defined in claim 7 wherein said open end of said piston is castellated, having a plurality of equidistantly spaced projections which define a plurality of equidistantly spaced recesses therebetween.

9. The piston assembly defined in claim 6 wherein said open end of said piston includes a recessed end surface, and said heat shield further includes a raised leg which engages said recessed end surface of said open end of said piston.

10. The piston assembly defined in claim 6 wherein said heat shield is formed from metal and said piston is formed from metal.

11. The piston assembly defined in claim 6 wherein said piston includes a first body portion which defines a first outer diameter adjacent said closed end and a second body portion which defines a second outer diameter adjacent said open end, said first outer diameter being greater than said second outer diameter.

12. The piston assembly defined in claim 6 wherein said body includes a generally reversely bent back outer peripheral edge.

13. The piston assembly defined in claim 6 wherein said opening in said heat shield is generally arcuately shaped and said projection of said piston is generally arcuately shaped.

14. A disc brake assembly comprising:

a caliper provided with at least one cylindrical recess formed therein;

a piston slidably disposed in said recess, said piston having a closed end and an open end, said open end of said piston provided with at least a pair of projections extending therefrom, said projections defining a pair of abutment surfaces and a pair of end surfaces located axially inward relative to said abutment surfaces;

a boot seal provided about said piston adjacent said open end thereof;

a pair of brake shoes carried by said disc brake assembly and disposed on opposite axial sides of an associated rotor, each of said brake shoes including a backing plate and a friction pad;

actuation means carried by said caliper for selectively moving said brake shoes between a non-braking position, wherein each of said friction pads shoes is spaced apart from an adjacent side of the rotor, and a braking position, wherein each of said friction pads frictionally engages the adjacent side of the rotor; and a heat shield attached to said open end of said piston, said heat shield including a pair of openings generally corresponding to the shape of said projections, a pair of outwardly extending tangs adjacent said openings and adapted to frictionally engage an inner surface of said projections to attach said heat shield to said piston, and a reversely bent back outer peripheral end spaced apart from said boot seal.

15. The disc brake assembly defined in claim 14 wherein said heat shield includes an inwardly raised leg located between each of said openings for engaging said pair of end surfaces of said open end of said piston.

16. The disc brake assembly defined in claim 14 wherein said heat shield is formed from a stamped strip of metal.

17. The disc brake assembly defined in claim 13 wherein said pair of openings in said heat shield are generally arcuately shaped and said projections of said piston are generally arcuately shaped.

18. The disc brake assembly defined in claim 13 wherein said piston includes a first body portion which defines a first outer diameter adjacent said closed end and a second body portion which defines a second outer diameter adjacent said open end, said first outer diameter being greater than said second outer diameter.

19. The disc brake assembly defined in claim 13 wherein said open end of said piston is castellated, having a plurality of equidistantly spaced projections which define a plurality of equidistantly spaced recesses therebetween.

20. The disc brake assembly defined in claim 14 wherein said piston is formed from steel.

21. A disc brake assembly comprising:

a caliper provided with at least one cylindrical recess formed therein;

a piston slidably disposed in said recess, said piston having a closed end and an open end, said open end of said piston provided with at least a pair of projections extending therefrom, said projections defining a pair of abutment surfaces and a pair of end surfaces located axially inward relative to said abutment surfaces;

a boot seal provided about said piston adjacent said open end thereof;

a pair of brake shoes carried by said disc brake assembly and disposed on opposite axial sides of an associated rotor, each of said brake shoes including a backing plate and a fiction pad;

actuation means carried by said caliper for selectively moving said brake shoes between a non-braking position, wherein each of said friction pads shoes is spaced apart from an adjacent side of the rotor, and a braking position, wherein each of said friction pads frictionally engages the adjacent side of the rotor; and a heat shield attached to said open end of said piston, said heat shield including a pair of openings generally corresponding to the shape of said projections, said projections extending respectively through said openings to support said heat shield on said open end of said piston.

* * * * *